US008660028B2

(12) United States Patent
Patil et al.

(10) Patent No.: US 8,660,028 B2
(45) Date of Patent: Feb. 25, 2014

(54) METHODS AND APPARATUS FOR RELAYING PEER DISCOVERY INFORMATION IN WWAN

(75) Inventors: Shailesh Patil, Bridgewater, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 13/073,851

(22) Filed: Mar. 28, 2011

(65) Prior Publication Data
US 2012/0250531 A1    Oct. 4, 2012

(51) Int. Cl.
*H04L 1/00* (2006.01)
(52) U.S. Cl.
USPC ........... 370/252; 709/223; 709/224; 709/225; 709/226
(58) Field of Classification Search
USPC .................................................. 370/240, 252
See application file for complete search history.

(56) References Cited

U.S. PATENT DOCUMENTS

| 2002/0143855 | A1 | 10/2002 | Traversat et al. |
| 2005/0152283 | A1 | 7/2005 | Ritzenthaler |
| 2009/0323647 | A1 | 12/2009 | Park et al. |
| 2010/0167743 | A1 | 7/2010 | Palanki et al. |
| 2010/0254308 | A1 | 10/2010 | Laroia et al. |
| 2011/0149799 | A1* | 6/2011 | Wu et al. ........................ 370/254 |

FOREIGN PATENT DOCUMENTS

EP    2023680    2/2009

OTHER PUBLICATIONS

Kaufman, Cellular Network with an Overlaid Device to Device Network, 2008 IEEE.*
International Search Report and Written Opinion—PCT/US2012/031027—ISA/EPO—Jun. 22, 2012.
Kaufman B et al., "Cellular networks with an overlaid device to device network", Signals, Systems and Computers, 2008 42nd Asilomar Conference on, IEEE, Piscataway, NJ, USA, Oct. 26, 2008, pp. 1537-1541, XP031475555, ISBN: 978-1-4244-2940-0 * chapter III B * * chapters 1, 11, 111 A, IV *.
Xinzhou Wu et al: "FlashLinQ: A synchronous distributed scheduler for peer-to-peer ad hoc networks", Communication, Control, and Computing (Allerton), 2010 48th Annual Allerton Conference on, IEEE, Sep. 29, 2010, pp. 514-521, XP031899421, DOI: 10.1109/Allerton.2010.5706950 ISBN: 978-1-4244-8215-3.
Xinzhou Wu: "FlashLinQ: A Clean Slate Design for Ad Hoc", Qualcomm May 4, 2010, XP002660751, Retrieved from the Internet: URL: scenic.princeton.edu/ppt/FLQEdge.ppt [retrieved on Oct. 6, 2011].
Subramanian A.P., et al ., "Interference Aware Routing in Multi-Radio Wireless Mesh Networks," Wireless Mesh Networks 2006, WiMesh 2006, 2nd IEEE Workshop on IEEE 2006, pp. 55-63, ISBN: 1-4244-0732-X.

(Continued)

*Primary Examiner* — Charles C Jiang
(74) *Attorney, Agent, or Firm* — James K. O'Hare

(57) ABSTRACT

A method, an apparatus, and a computer program product are provided in which a peer discovery signal is received from a second apparatus. At least one of a path loss to a serving base station or a path loss to a neighboring base station is determined. Whether to relay the peer discovery signal is determined based on the at least one of the path loss to the serving base station or the path loss to the neighboring base station. The peer discovery signal is sent upon determining to relay the peer discovery signal.

24 Claims, 18 Drawing Sheets

(56) References Cited

OTHER PUBLICATIONS

Wei Hung-Yu., et al., "Interference-Aware IEEE 802.16 WiMax Mesh Networks," in: Proceedings of 61st IEEE vehicular Technology Conference (VTC 2005 Spring), Sweden, May 29-Jun. 1, 2005, vol. 5, pp. 1-5.

Xu J., et al., "Interference-aware Relay Selection for Multiple Source-Destination Cooperative Networks," IEEE, Proceedings of the 15th Asia-Pacific Conference on Communications, 2009. APCC 2009, pp. 338-341, E-ISBN: 978-1-4244-4785-5.

* cited by examiner

METHODS AND APPARATUS FOR RELAYING PEER DISCOVERY INFORMATION IN WWAN

BACKGROUND

1. Field

The present disclosure relates generally to communication systems, and more particularly, to relaying peer discovery signals in a wireless wide area network (WWAN).

2. Background

Peer discovery is an important functionality of a peer-to-peer communication system. One important performance metric in peer discovery is peer discovery range. There is a need for improving peer discovery range in a peer-to-peer communication system.

SUMMARY

In an aspect of the disclosure, a method, an apparatus, and a computer program product are provided in which a peer discovery signal is received from a second apparatus. At least one of a path loss to a serving base station or a path loss to a neighboring base station is determined. Whether to relay the peer discovery signal is determined based on the at least one of the path loss to the serving base station or the path loss to the neighboring base station. The peer discovery signal is sent upon determining to relay the peer discovery signal.

DETAILED DESCRIPTION

Figure 1:
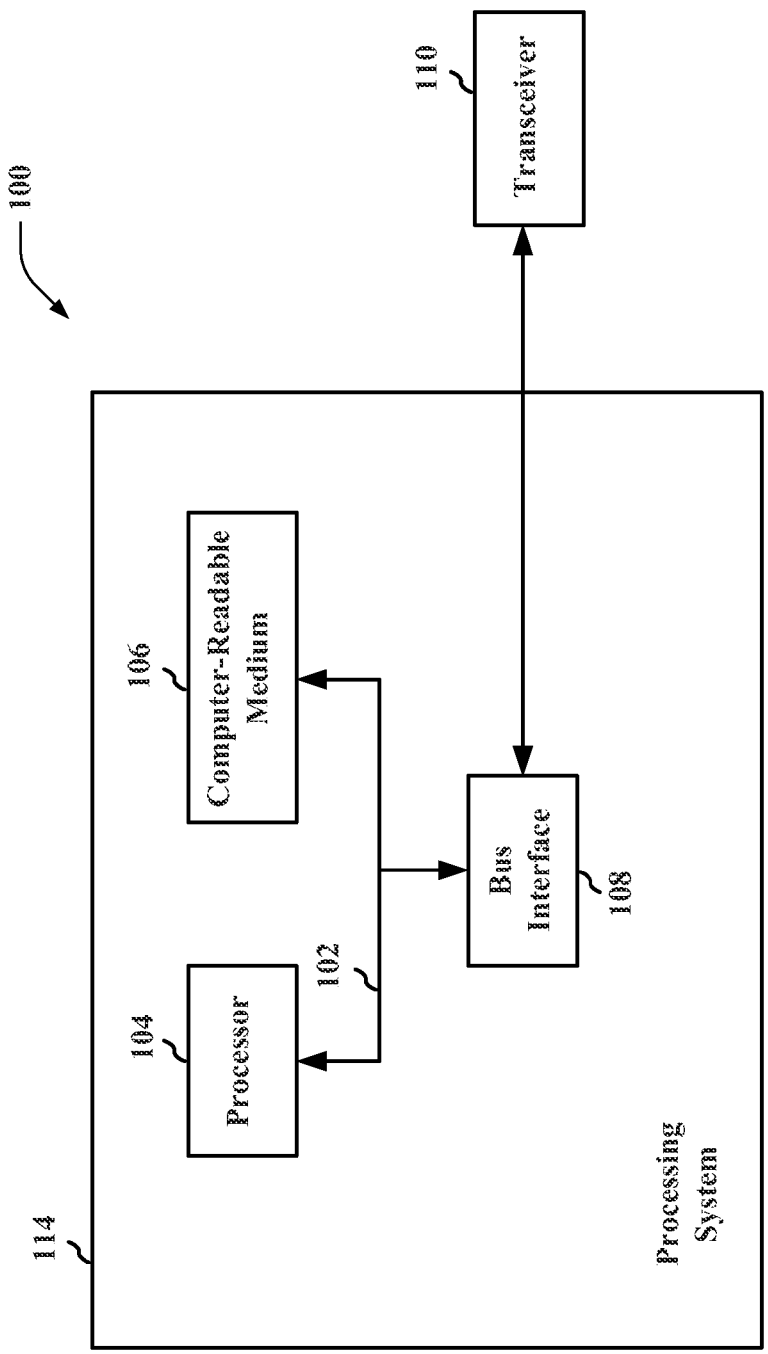
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
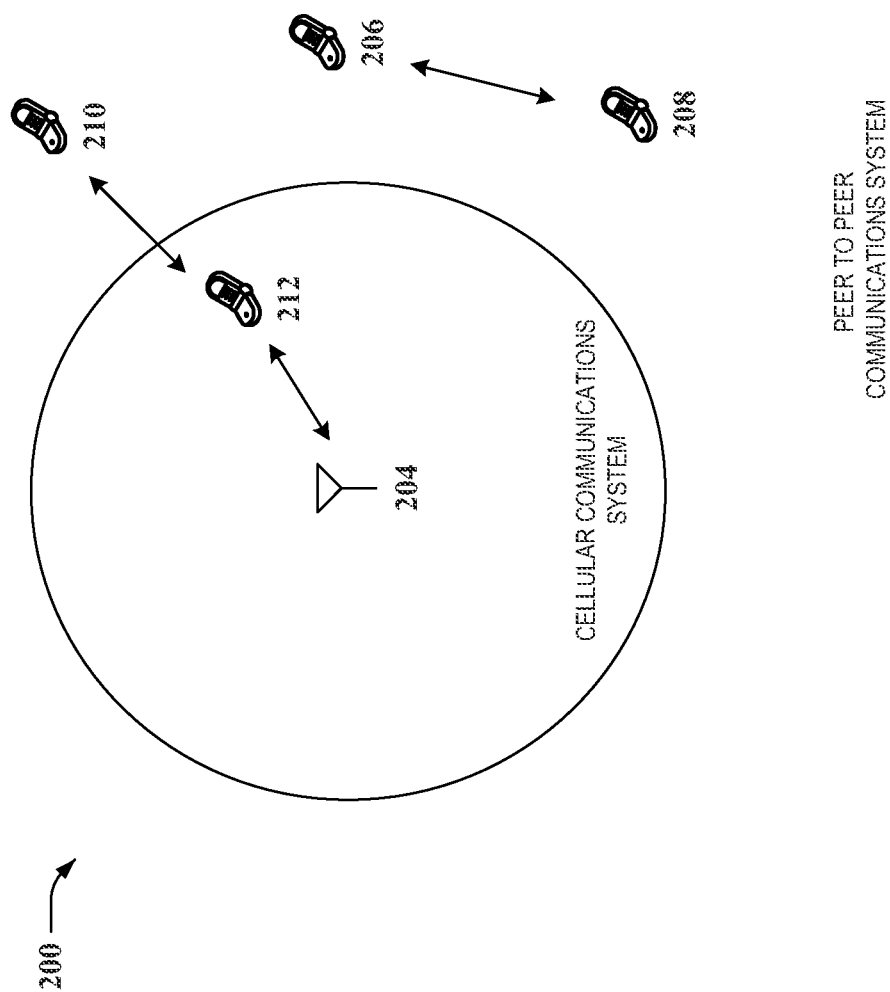
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
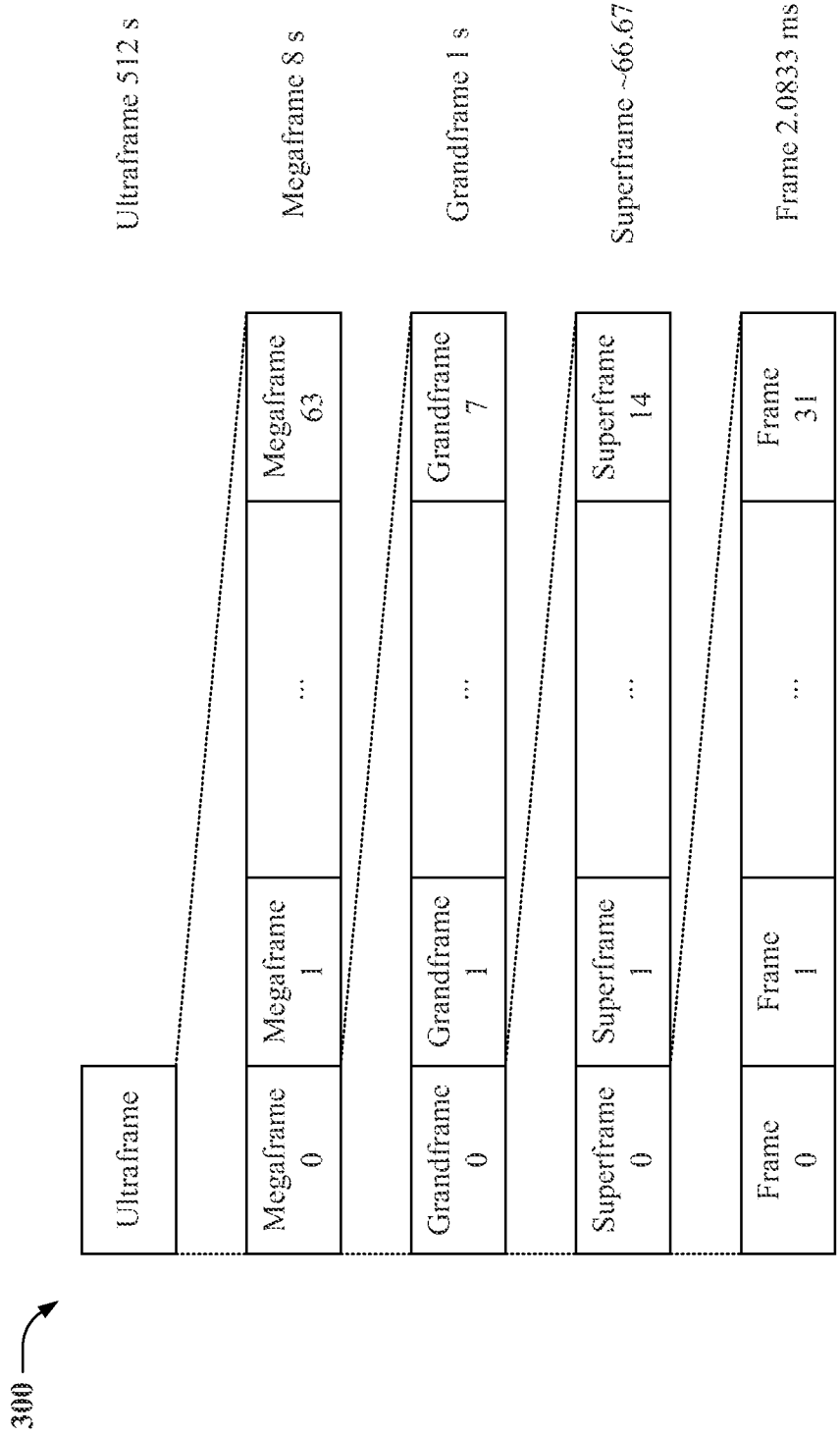
FIG. 3 is a diagram illustrating a time structure for peer-to-peer communication between the wireless devices.

FIG. 3 is a diagram 300 illustrating a time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
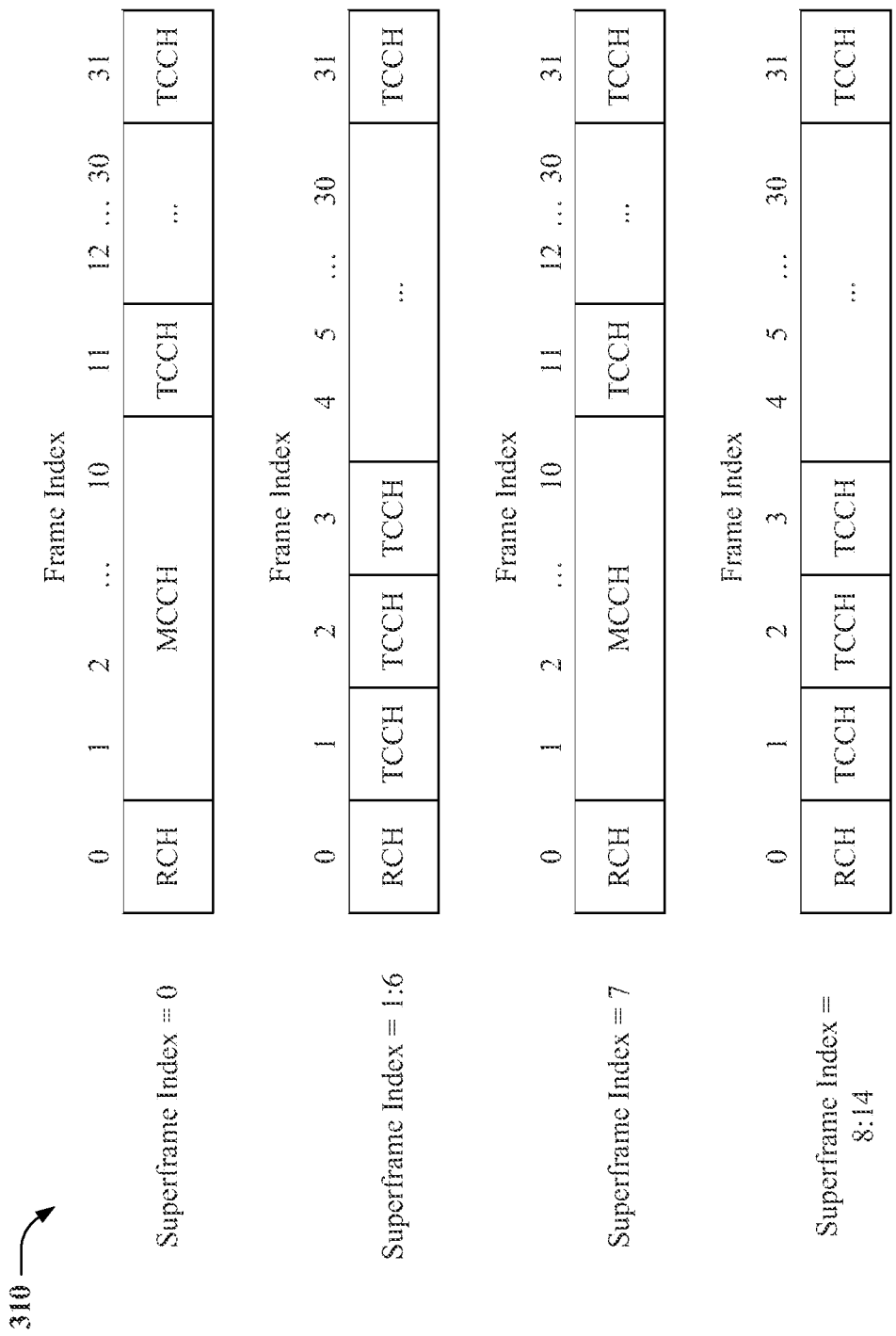
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
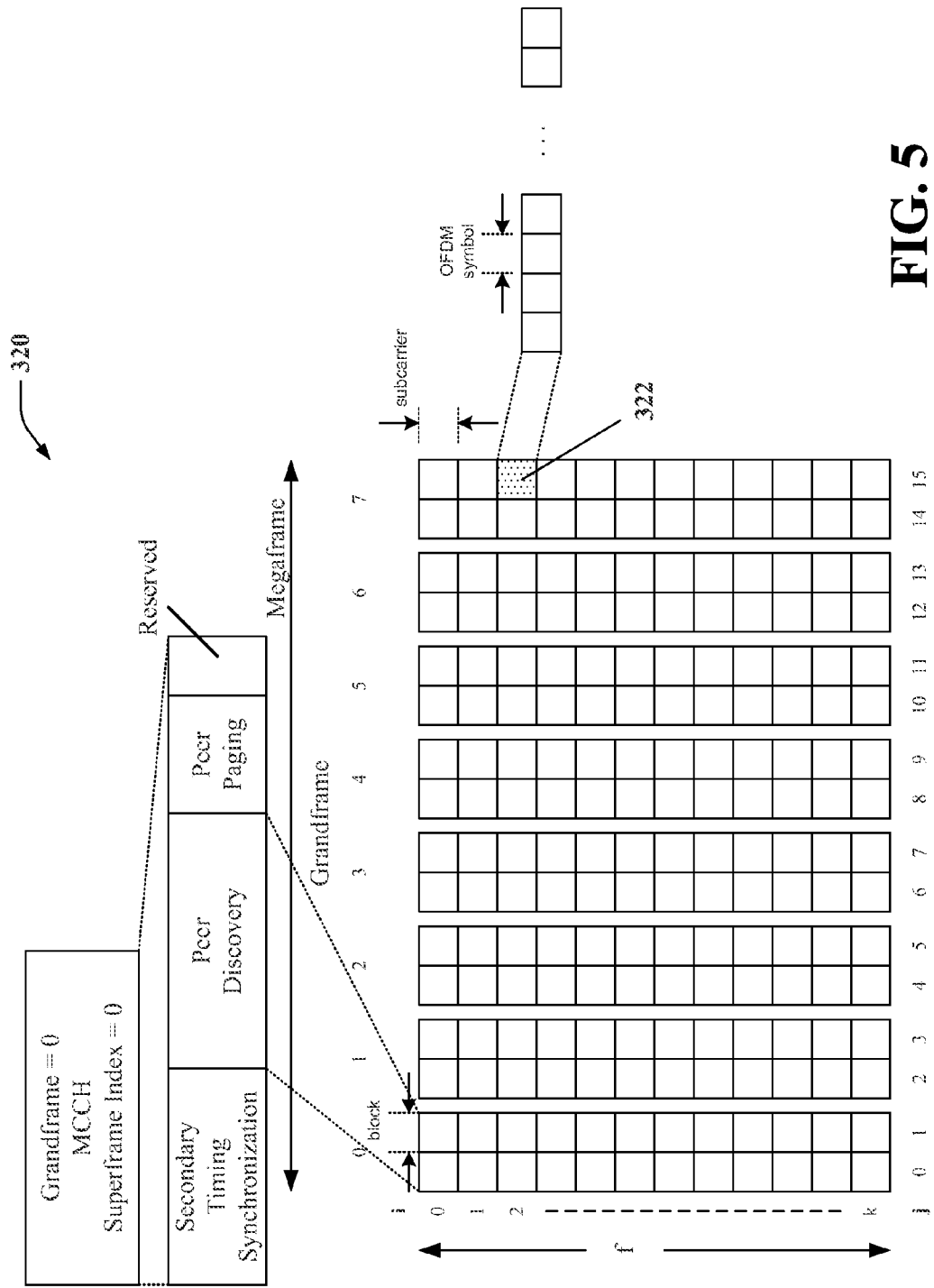
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

Figure 6:
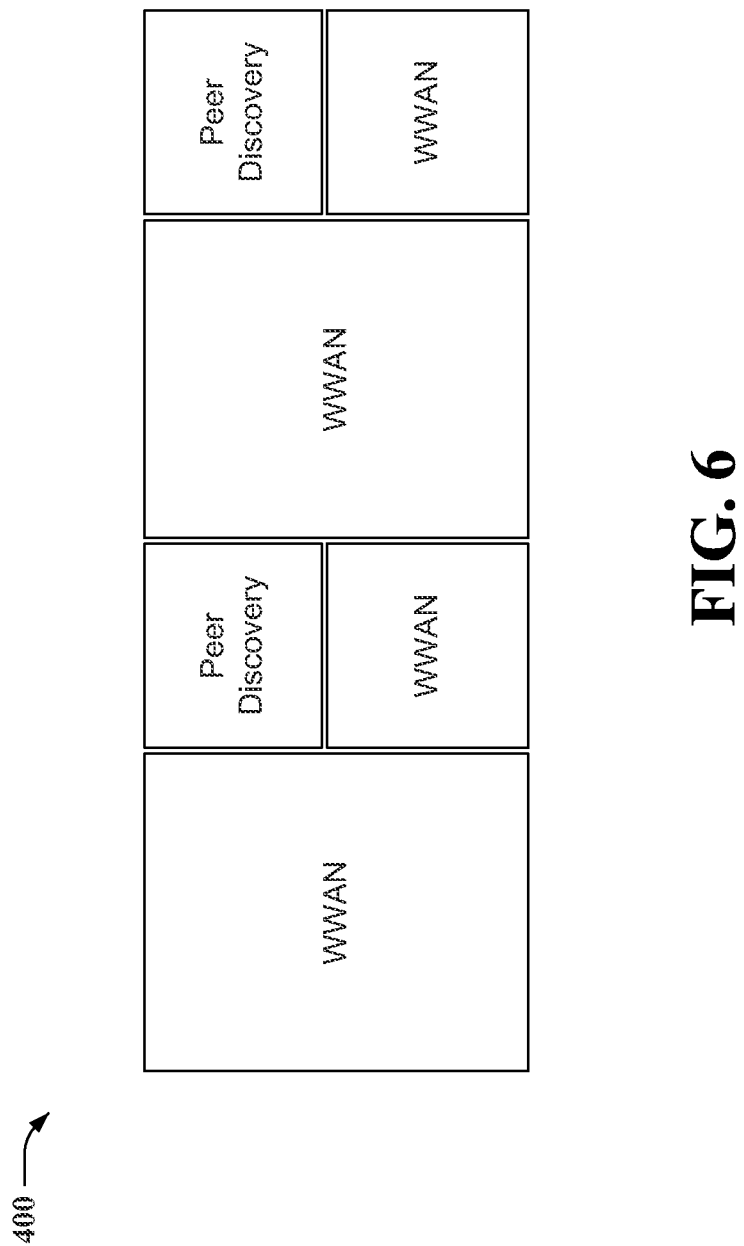
FIG. 6 is a diagram illustrating a partitioning between WWAN and peer discovery resources.

FIG. 6 is a diagram 400 illustrating a partitioning between WWAN and peer discovery resources. In a WWAN, all communication between wireless devices goes through the uplink/downlink channels between the wireless devices and the serving base station. Two wireless devices in the vicinity of each other may communicate directly rather than communicate through a base station. Such direct peer-to-peer communication may enable new types of services and/or reduce the traffic load on the base station. Two wireless devices may discover each other through periodically broadcasting a peer discovery signal, listening to the broadcasted peer discovery signal, and decoding the received signal. A WWAN base station can set aside time frequency resources for wireless devices to transmit their peer discovery signals. The time frequency resources can be set aside parallel in time to the downlink and/or the uplink WWAN resources. An example of such partitioning is shown in FIG. 6.

Wireless devices may maximize the range of peer discovery by transmitting peer discovery signals at maximum power. However, transmission of peer discovery signals at maximum power can cause substantial interference to communication (WWAN and peer-to-peer) within neighboring cells, especially if the interfering wireless devices are near the cell edge of the neighboring cell. This is especially true in unsynchronized deployments where peer discovery signals can significantly disrupt WWAN communication in neighboring cells. To reduce interference to neighboring cells, wireless devices may sacrifice the performance of peer discovery by reducing the periodicity and/or power of transmitting peer discovery signals. Reducing the periodicity of transmitting peer discovery signals, increases the delay in being discovered by other peers. Reducing the power at which peer discovery signals are transmitted, reduces the range of peer discovery. The range of peer discovery in WWAN environments may be increased using relays.

Figure 7:
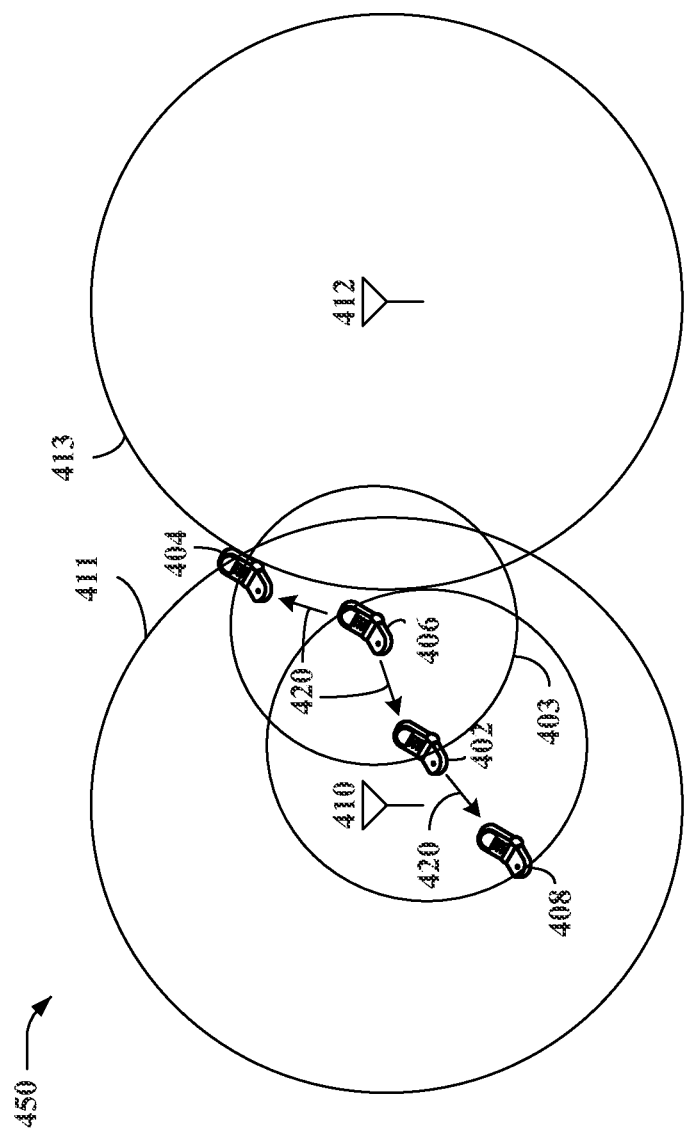
FIG. 7 is a diagram for illustrating an exemplary method.

FIG. 7 is a diagram 450 for illustrating an exemplary method. As shown in FIG. 7, the wireless device 406 transmits a peer discovery signal 420. The peer discovery signal 420 is received by the wireless device 404 and the wireless device 402. Both the wireless devices 404, 402 determine the path loss to the serving base station 410 and/or the path loss to the neighboring base station 412. The wireless device 404 determines that the path loss to the neighboring base station 412 is less than a first threshold and/or the path loss to the serving base station 410 is greater than a second threshold. Based on the determined path loss information, the wireless device 404 determines not to relay the peer discovery signal 420. In contrast, the wireless device 402 determines that the path loss to the neighboring base station 412 is greater than the first threshold and/or the path loss to the serving base station 410 is less than the second threshold. Based on the determined path loss information, the wireless device 402 determines to relay the peer discovery signal 420. Because the wireless device 402 relays the peer discovery signal 420, the wireless device 408 is able to receive the peer discovery signal 420 even though the wireless device 408 is outside the range of receiving the peer discovery signal 420 directly from the wireless device 406.

According to the exemplary method, wireless devices such as the wireless device 404 at the cell edge 411 and/or the cell edge 413 do not relay received peer discovery signals and wireless devices such as the wireless device 402 closer to the serving base station 410 relay received peer discovery signals. The exemplary method effectively extends the peer discovery range of the wireless device 406 without substantially increasing interference to communication within neighboring cells. That is, the wireless device 406 may decrease its peer discovery transmit power to decrease an interference caused to communication within the cell of the neighboring base station 412. The lower transmit power reduces the range 403 at which its peer discovery signal 420 can be detected. Through the exemplary method, wireless devices closer to the serving base station 410 relay the peer discovery signal 420, thus increasing the effective range at which its peer discovery signal 420 can be detected without substantially increasing an interference caused to communication within the cell of the neighboring base station 412.

In addition to determining path loss information, the wireless devices 404, 402 may determine a signal strength of the received peer discovery signal and determine whether to relay the received peer discovery signal based on the determined signal strength. As such, a wireless device closer to the wireless device 406 may determine to abstain from relaying (i.e., not to relay) the peer discovery signal 420 when a signal strength of a received peer discovery signal 420 is greater than a threshold, but a wireless device further from the wireless device 406 may determine to relay the peer discovery signal 420 when the signal strength of the received peer discovery signal 420 is less than the threshold. Relaying based on a signal strength of a received peer discovery signal allows wireless devices to conserve energy if the wireless devices would not sufficiently extend the peer discovery range through relaying.

Figure 8:
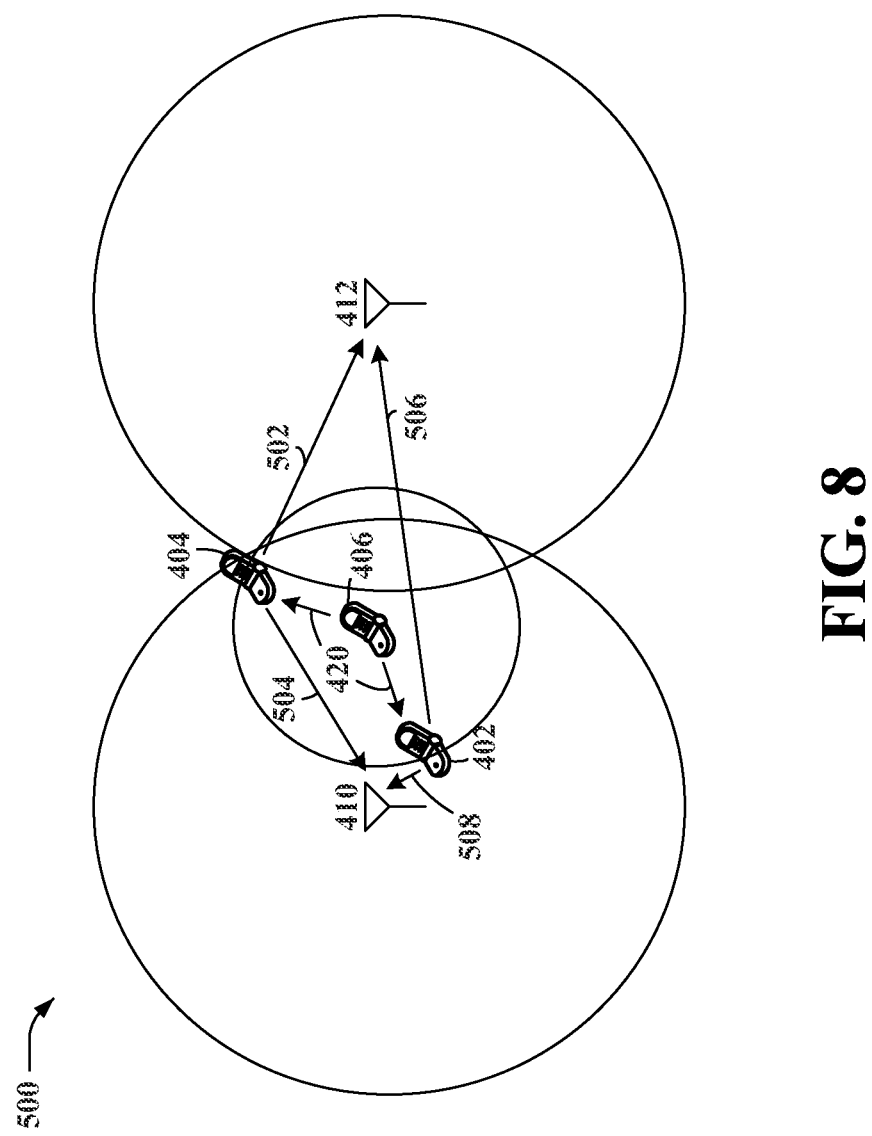
FIG. 8 is another diagram for illustrating an exemplary method.

FIG. 8 is another diagram 500 for illustrating an exemplary method. As discussed supra, the wireless devices 404, 402 determine path loss information related to the serving base station 410 and/or the neighboring base station 412 and determine whether to relay the received peer discovery signal 420 based on the determined path loss information. As such, the wireless device 404 may determine a path loss 504 to the serving base station 410 and/or a path loss 502 to the neighboring base station 412. Based on the path loss 504 and/or the path loss 502, the wireless device 404 determines whether to relay the received peer discovery signal 420. Also, the wireless device 402 may determine a path loss 508 to the serving base station 410 and/or a path loss 506 to the neighboring base station 412. Based on the path loss 508 and/or the path loss 506, the wireless device 402 determines whether to relay the received peer discovery signal 420.

The wireless device 404 may determine to relay the peer discovery signal 420 when the path loss 504 to the serving base station 410 is less than a first threshold and/or the path loss 502 to the neighboring base station 412 is greater than a second threshold. Likewise, the wireless device 402 may determine to relay the peer discovery signal 420 when the path loss 508 to the serving base station 410 is less than the first threshold and/or the path loss 506 to the neighboring base station 412 is greater than the second threshold. Alternatively, the determined path loss information may be a ratio of the path losses and a wireless device may determine whether to relay based on whether the path loss ratio is less than or greater than a threshold. For example, the wireless device 402 may determine a path loss ratio equal to the path loss 508 divided by the path loss 506, and determine to relay the received peer discovery signal 420 when the path loss ratio is less than a threshold.

Upon determining to relay the received peer discovery signal 420, the wireless device 402 may also determine a frequency of relaying the peer discovery signal 420 based on the path loss 508 to the serving base station 410 and/or the path loss 506 to the neighboring base station 412. For example, the wireless device 402 may use the path loss 508, the path loss 506, or both the path losses 506, 508 in a ratio to determine the frequency of relaying the peer discovery signal. In such a configuration, the wireless device 402 may determine to increase the frequency of relaying the peer discovery signal 420 when the path loss 508 to the serving base station 410 is less than a first threshold and/or the path loss 506 to the neighboring base station 412 is greater than a second threshold, and to decrease the frequency of relaying the peer discovery signal 420 when the path loss 508 to the serving base station 410 is greater than a third threshold and/or the path loss 506 to the neighboring base station 412 is less than a fourth threshold. In such a configuration, the first threshold is less than or equal to the third threshold and the second threshold is greater than or equal to the fourth threshold.

Upon determining to relay the received peer discovery signal 420, the wireless device 402 may also determine a transmit power for relaying the peer discovery signal 420 based on the path loss 508 to the serving base station 410 and/or the path loss 506 to the neighboring base station 412. For example, the wireless device 402 may use the path loss 508, the path loss 506, or both the path losses 506, 508 in a ratio to determine the transmit power for relaying the peer discovery signal. In such a configuration, the wireless device 402 may determine to increase the transmit power for relaying the peer discovery signal 420 when the path loss 508 to the serving base station 410 is less than a first threshold and/or the path loss 506 to the neighboring base station 412 is greater than a second threshold, and to decrease the transmit power for relaying the peer discovery signal 420 when the path loss 508 to the serving base station 410 is greater than a third threshold and/or the path loss 506 to the neighboring base station 412 is less than a fourth threshold. In such a configuration, the first threshold is less than or equal to the third threshold and the second threshold is greater than or equal to the fourth threshold.

Figure 9:
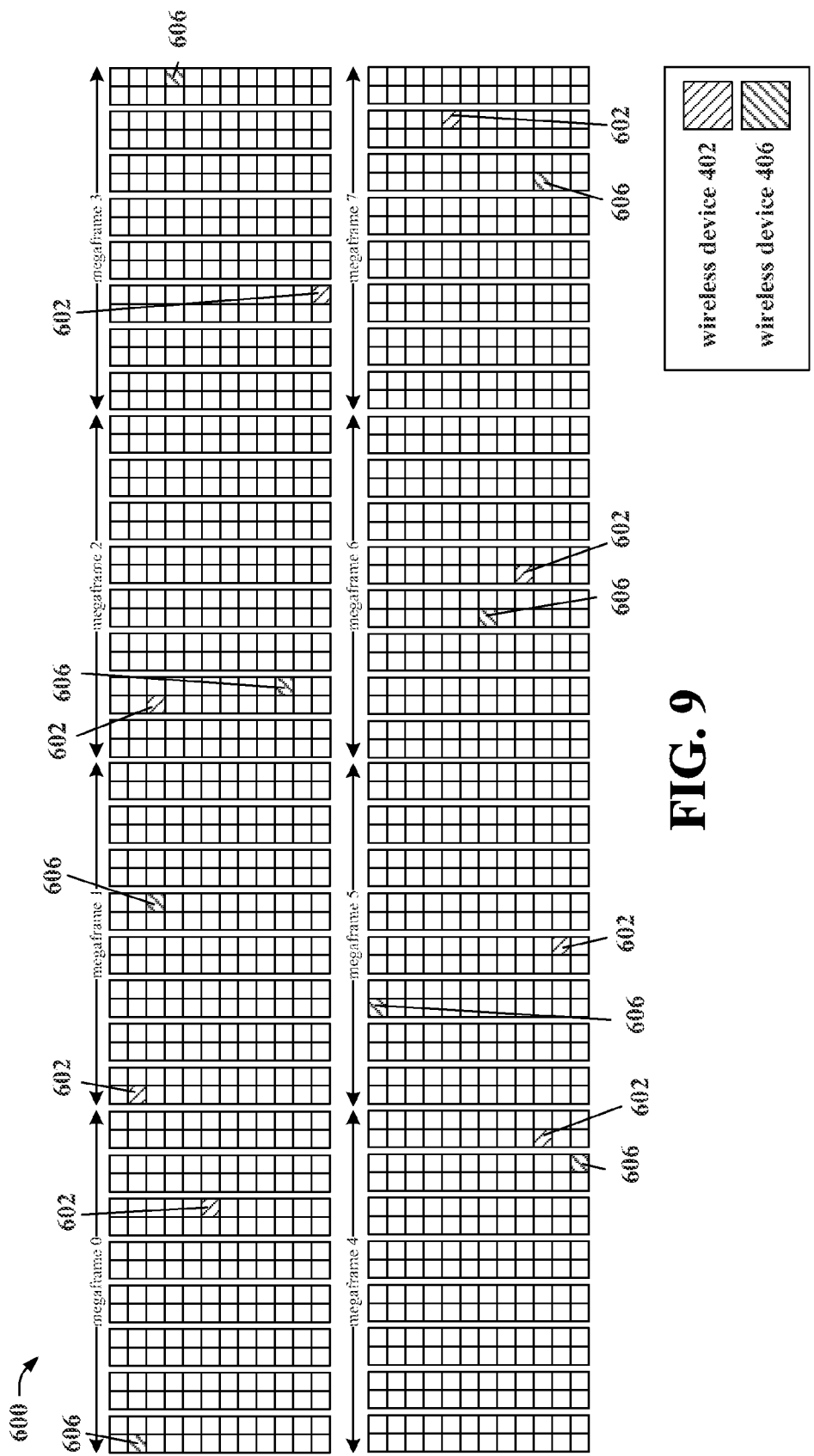
FIG. 9 is a diagram for illustrating resources utilized by a first wireless device for transmitting peer discovery signals and a second wireless device for transmitting peer discovery signals.

FIG. 9 is a diagram 600 for illustrating resources (e.g., blocks) utilized by a first wireless device 402 for transmitting peer discovery signals and a second wireless device 406 for transmitting peer discovery signals. The resources 602 utilized for transmitting peer discovery signals by the wireless device 402 are shown with a back diagonal pattern and the resources 606 utilized for transmitting peer discovery signals by the wireless device 406 are shown with a forward diagonal pattern. As shown in FIG. 9, the wireless device 406 transmits a peer discovery signal on the identified resources 606 associated with a first PDRID in each of the megaframes. The wireless device 402 transmits a peer discovery signal on the identified resources 602 associated with a second PDRID in each of the megaframes. The wireless device 402 listens for peer discovery signals on all other resources other than the resources 602. As discussed in relation to FIG. 5, the utilized resource may hop to a different resource in each of the megaframes. For convenience, only 8 megaframes are shown.

Figure 10:
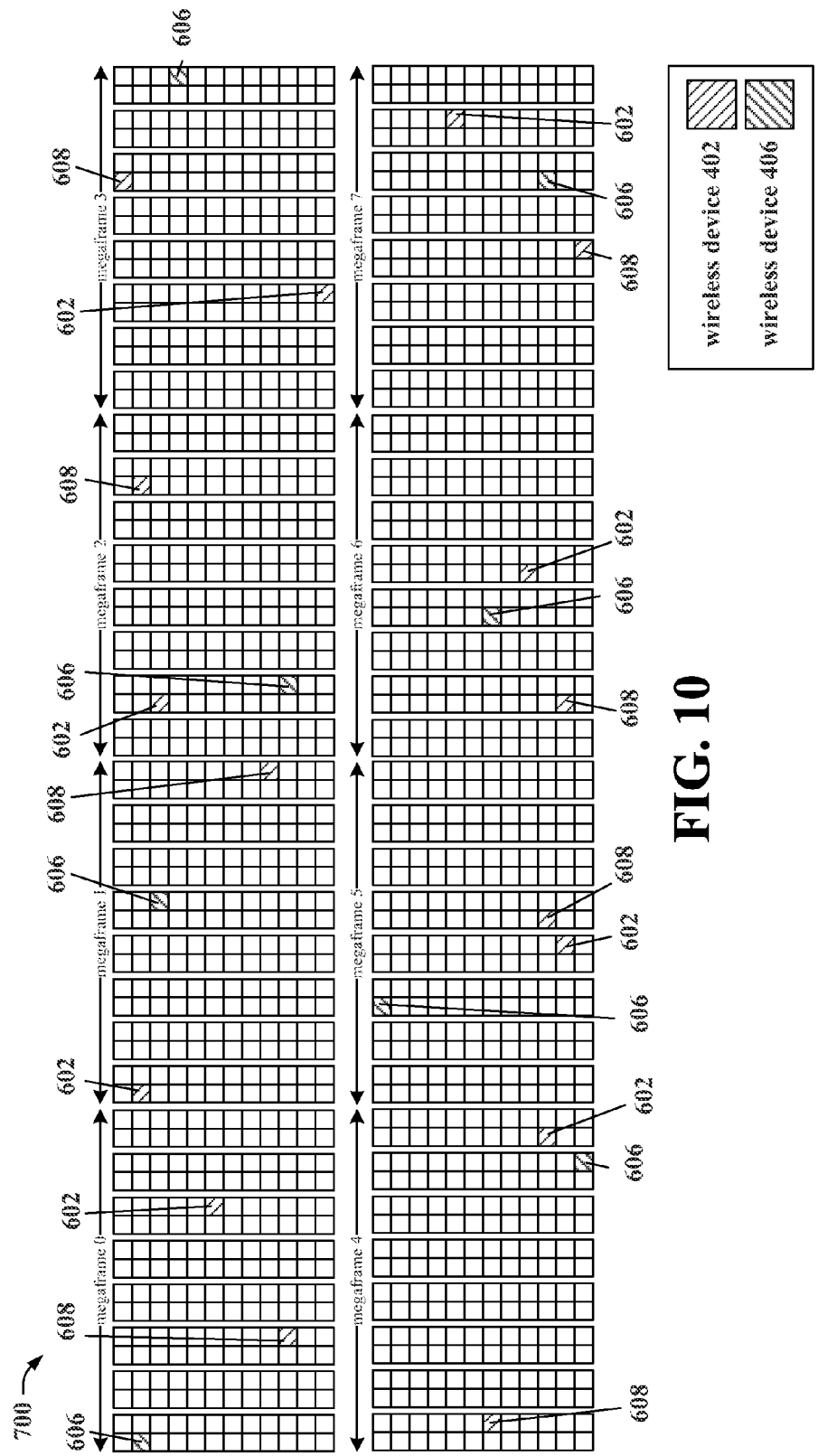
FIG. 10 is a first diagram for illustrating resources utilized by a first wireless device for relaying/transmitting peer discovery signals and a second wireless device for transmitting peer discovery signals.

FIG. 10 is a first diagram 700 for illustrating resources utilized by a first wireless device 402 for relaying/transmitting peer discovery signals and a second wireless device 406 for transmitting peer discovery signals. In one configuration, a wireless device receives a peer discovery signal on a first resource in a set of resources associated with a particular PDRID and relays the peer discovery signal on a second resource unassociated with the particular PDRID. For example, as shown in FIG. 10, the wireless device 402 may receive a peer discovery signal on a first resource in a set of resources 606 associated with a particular PDRID of the wireless device 406 and relay the peer discovery signal on a second resource 608 unassociated with the particular PDRID.

Figure 11:
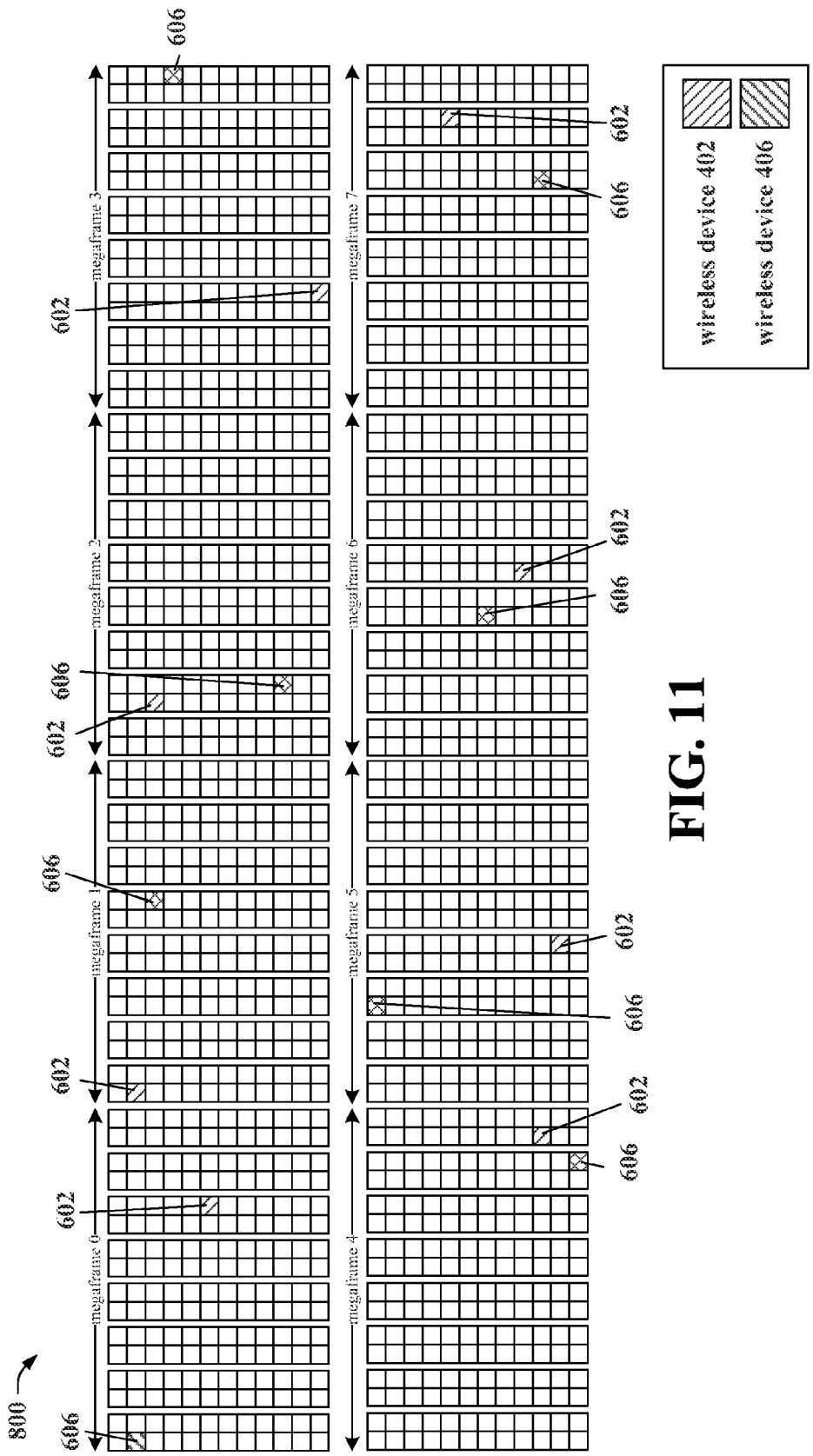
FIG. 11 is a second diagram for illustrating resources utilized by a first wireless device for relaying/transmitting peer discovery signals and a second wireless device for transmitting peer discovery signals.

FIG. 11 is a second diagram 800 for illustrating resources utilized by a first wireless device 402 for relaying/transmitting peer discovery signals and a second wireless device 406 for transmitting peer discovery signals. As shown in FIG. 11, rather than relay the peer discovery signal on resources unassociated with the particular PDRID of the wireless device 406, the wireless device 402 may relay the peer discovery signal on the resources 606 associated with the particular PDRID. For example, the wireless device 402 may listen for the peer discovery signal of the wireless device 406 on the resource 606 of megaframe 0 associated with the PDRID of the wireless device 406. The wireless device 402 may then relay the received peer discovery signal on other resources associated with the PDRID of the wireless device 406, such as on the resources 606 of megaframes 1 through 7.

Figure 12:
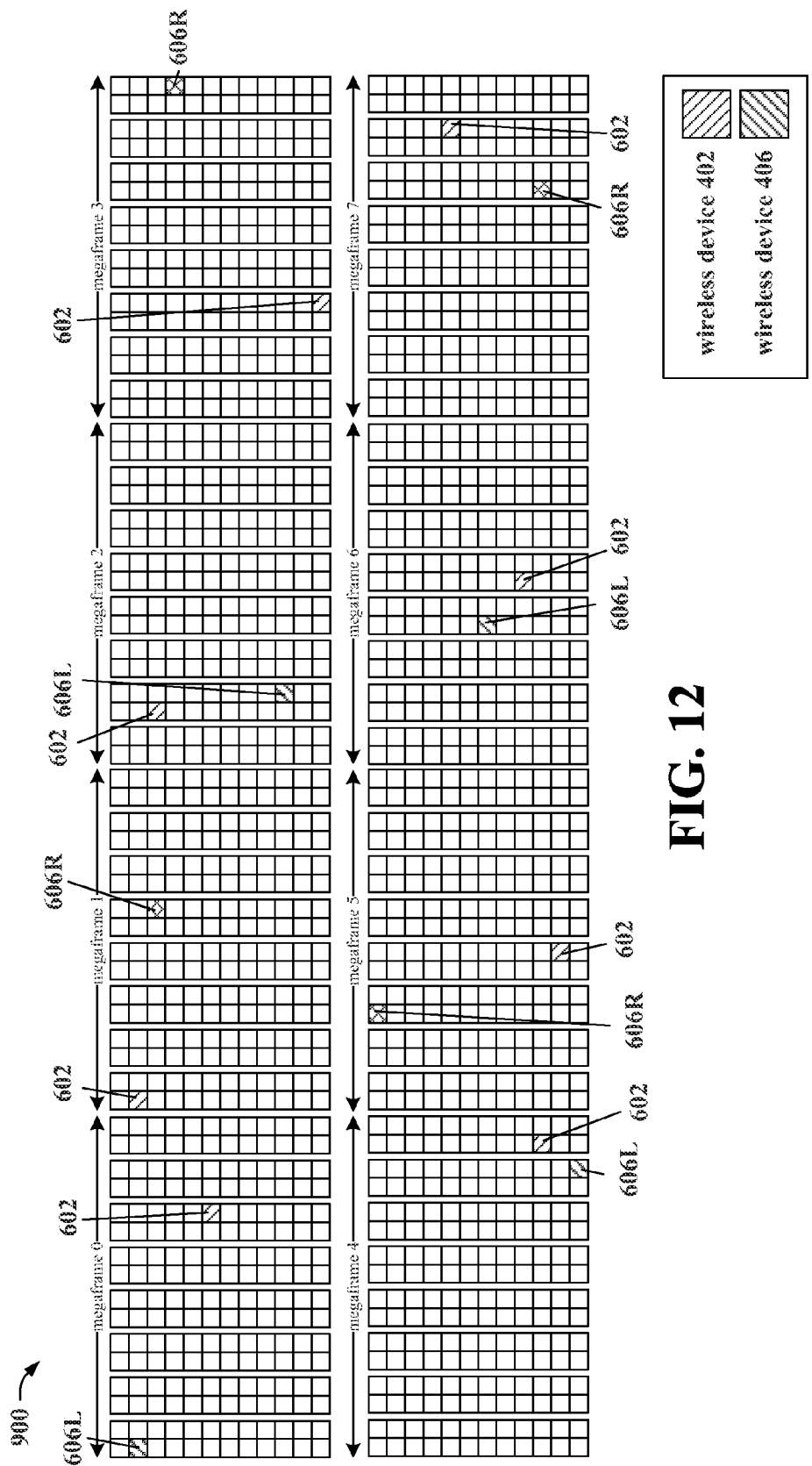
FIG. 12 is a third diagram for illustrating resources utilized by a first wireless device for relaying/transmitting peer discovery signals and a second wireless device for transmitting peer discovery signals.

FIG. 12 is a third diagram 900 for illustrating resources utilized by a first wireless device 402 for relaying/transmitting peer discovery signals and a second wireless device 406 for transmitting peer discovery signals. In one configuration, the set of resources 606 (i.e., 606L, 606R) include a relaying subset of resources 606R and a listening subset of resources 606L different from the relaying subset of resources 606R. In such a configuration, the wireless device 402 listens for peer discovery signals on the listening subset of resources 606L and relays peer discovery signals on the relaying subset of resources 606R. As shown in FIG. 12, the listening subset of resources 606L are in even megaframes and the relaying subset of resources 606R are in odd megaframes. However, the division of the listening subset of resources 606L and the relaying subset of resources 606R may be defined differently.

When the wireless device 402 receives a decodable peer discovery signal on the resources 606R, but does not receive a decodable peer discovery signal on resources 606L, the wireless device 402 will not relay the received peer discovery signal. By splitting the resources 606 into a listening subset of resources 606L and a relaying subset of resources 606R, a relay chain that causes the range expansion to be too large can be avoided. When a wireless device cannot distinguish a relayed and an original peer discovery signal, the wireless device may relay the relayed peer discovery signal even through the wireless device is unable to decode the original peer discovery signal. Relaying relayed peer discovery signals when the original peer discovery signal is undecodable could result in a peer discovery range expansion that is too large for effective peer-to-peer communication between the originating wireless device and any wireless device receiving the relayed peer discovery signal. Furthermore, as discussed infra, if the relay transmission is actually reducing the discovery range rather than increasing the discovery range, by relaying only in the relaying subset of resources 606R, the discovery range will be negatively affected only in the relaying subset of resources 606R.

Figure 13:
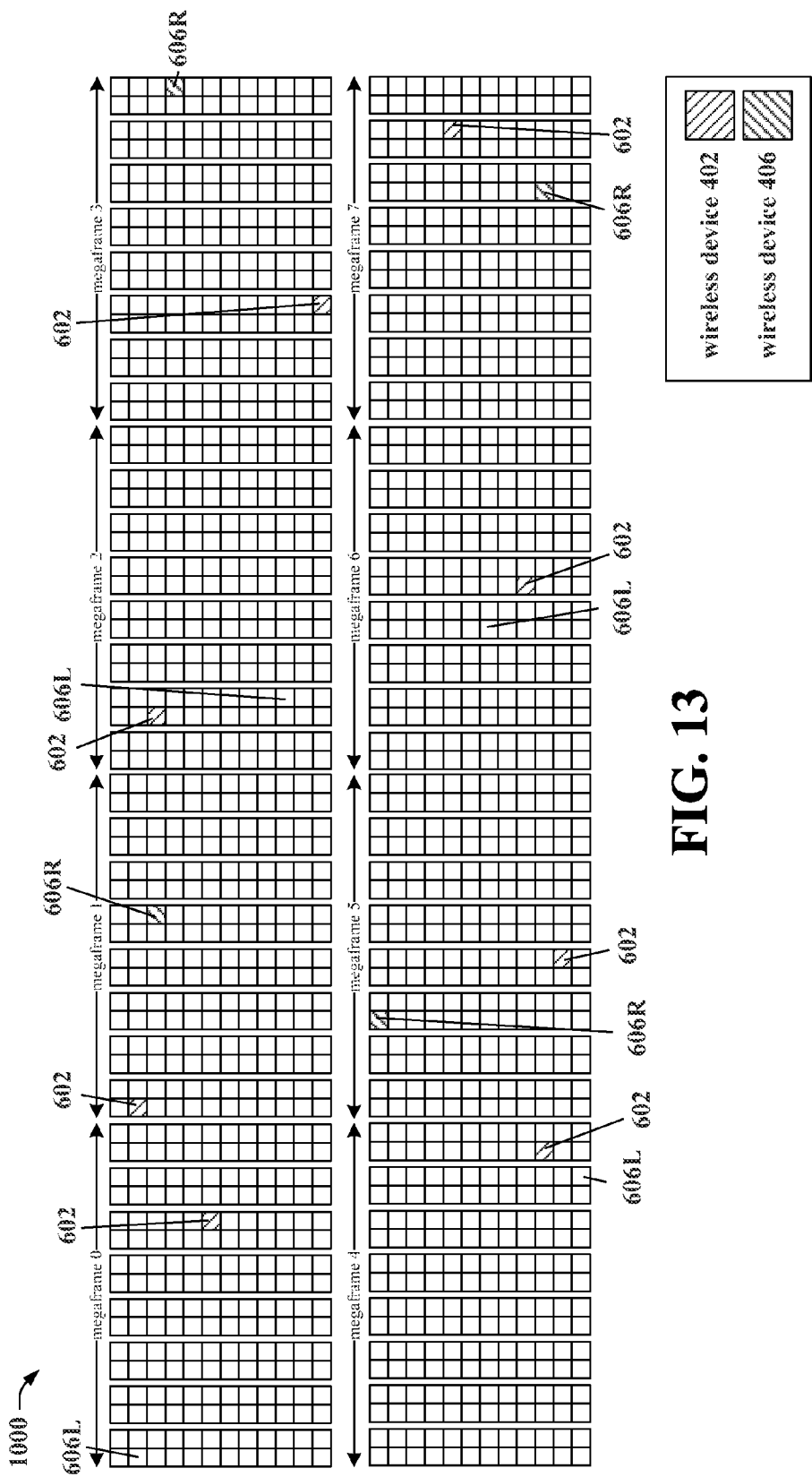
FIG. 13 is a fourth diagram for illustrating resources utilized by a first wireless device for relaying/transmitting peer discovery signals and a second wireless device for transmitting peer discovery signals.

FIG. 13 is a fourth diagram 1000 for illustrating resources utilized by a first wireless device 402 for relaying/transmitting peer discovery signals and a second wireless device 406 for transmitting peer discovery signals. As shown in FIG. 13, the wireless device 402 receives peer discovery signals on the resources 606R, but not on the resources 606L. The wireless device 402 determines whether to relay the peer discovery signal based on whether the peer discovery signal is received in the listening subset of resources 606L. Because the peer discovery signal is not received in the listening subset of resources 606L, even though the peer discovery signal is received in the relay subset of resources 606R, the wireless device 402 determines not to relay the peer discovery signal. Even if the wireless device 402 receives the a peer discovery signal in the listening subset of resources 606L, if the peer discovery signal is not decodable, the wireless device 402 will determine not to relay the peer discovery signal.

As discussed supra, the relayed peer discovery signal is transmitted on top of the originally transmitted peer discovery signal. The aggregate signal at any receiver will appear as the sum of multiple copies of the same signal with different delays. This is similar to a signal passing through a multipath fading channel. The OFDM cyclic prefix can absorb the delay spread and the receiver will see a boost of the transmission power of the signal, which leads to a larger peer discovery range. The introduction of the relay node may create frequency selective fading even in stationary channel conditions. As such, the relay node may actually reduce the reception capability of some of the nodes in the network, although on average the relay node can greatly improve discovery range. There are two design options to mitigate the reduction of reception capability. First, as discussed supra, the resources may be split into a listening subset of resources 606L and a relaying subset of resources 606R. As discussed supra, splitting the resources accordingly also allows wireless devices to distinguish relayed and original peer discovery signals, thus preventing an original peer discovery signal from being relayed such that peer discovery range expansion is too large for effective peer-to-peer communication between the originating wireless device and any wireless device receiving the relayed peer discovery signal. Second, the reduction of reception capability may be mitigated by applying an additional random phase rotation to the peer discovery signal before relaying the peer discovery signal. In such a configuration, in each time period of a relay transmission, the wireless device would randomly determine a phase rotation and apply the determined phase rotation to the peer discovery signal before relaying the peer discovery signal. The application of a random phase rotation over time would prevent the frequency selective fading from persistently affecting the same set of users.

Figure 14:
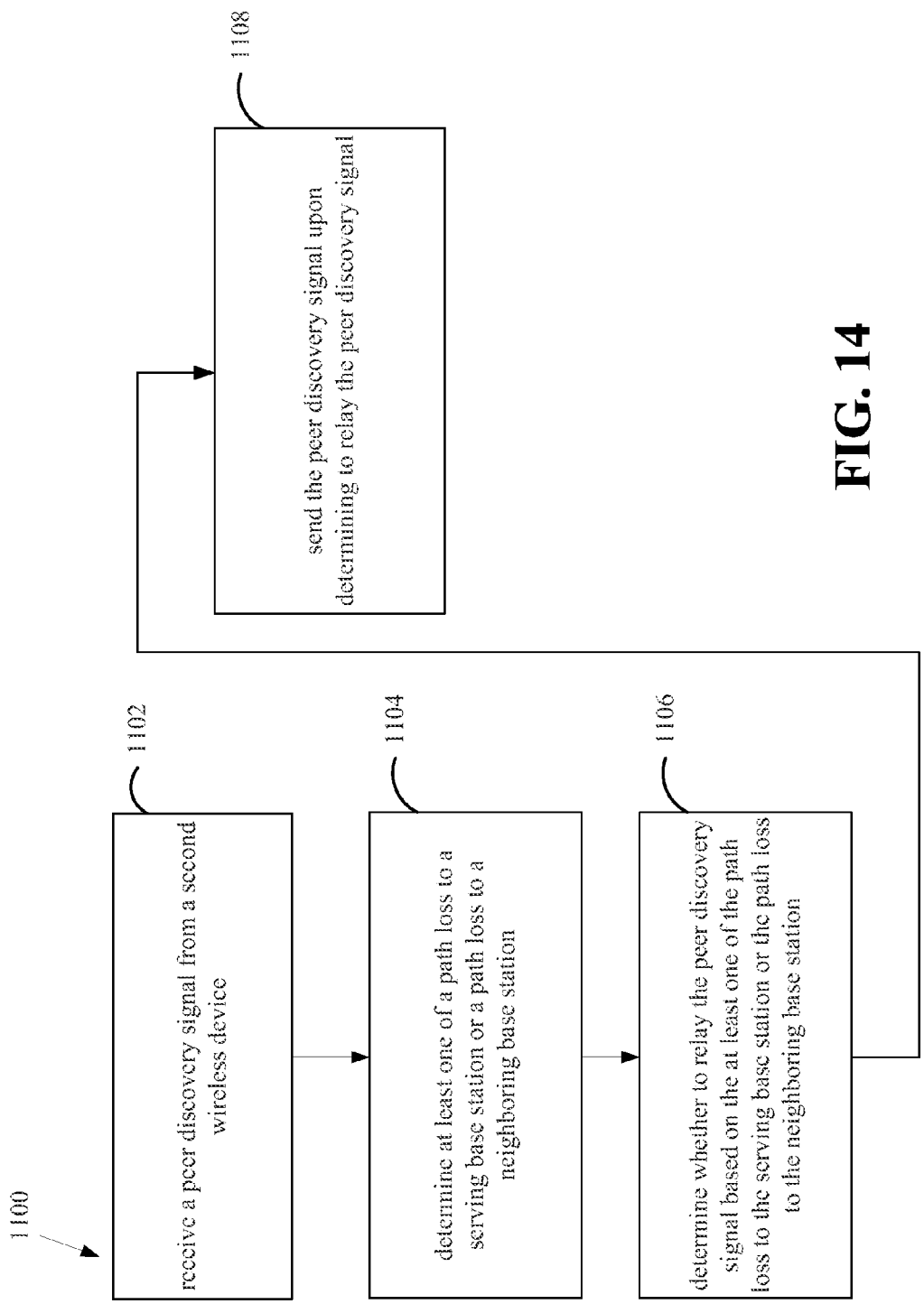
FIG. 14 is a first flow chart of a method of wireless communication.

FIG. 14 is a first flow chart 1100 of a method of wireless communication. The method may be performed by a wireless device, such as the wireless device 402. According to the method, the wireless device 402 receives a peer discovery signal 420 from a second wireless device 406 (1102). In addition, the wireless device determines at least one of a path loss 508 to a serving base station 410 or a path loss 506 to a neighboring base station 412 (1104). Furthermore, the wireless device 402 determines whether to relay the peer discovery signal 420 based on the at least one of the path loss 508 to the serving base station 410 or the path loss 506 to the neighboring base station 412 (1106). The wireless device 402 then sends the peer discovery signal 420 upon determining to relay the peer discovery signal 420 (1108).

Figure 15:
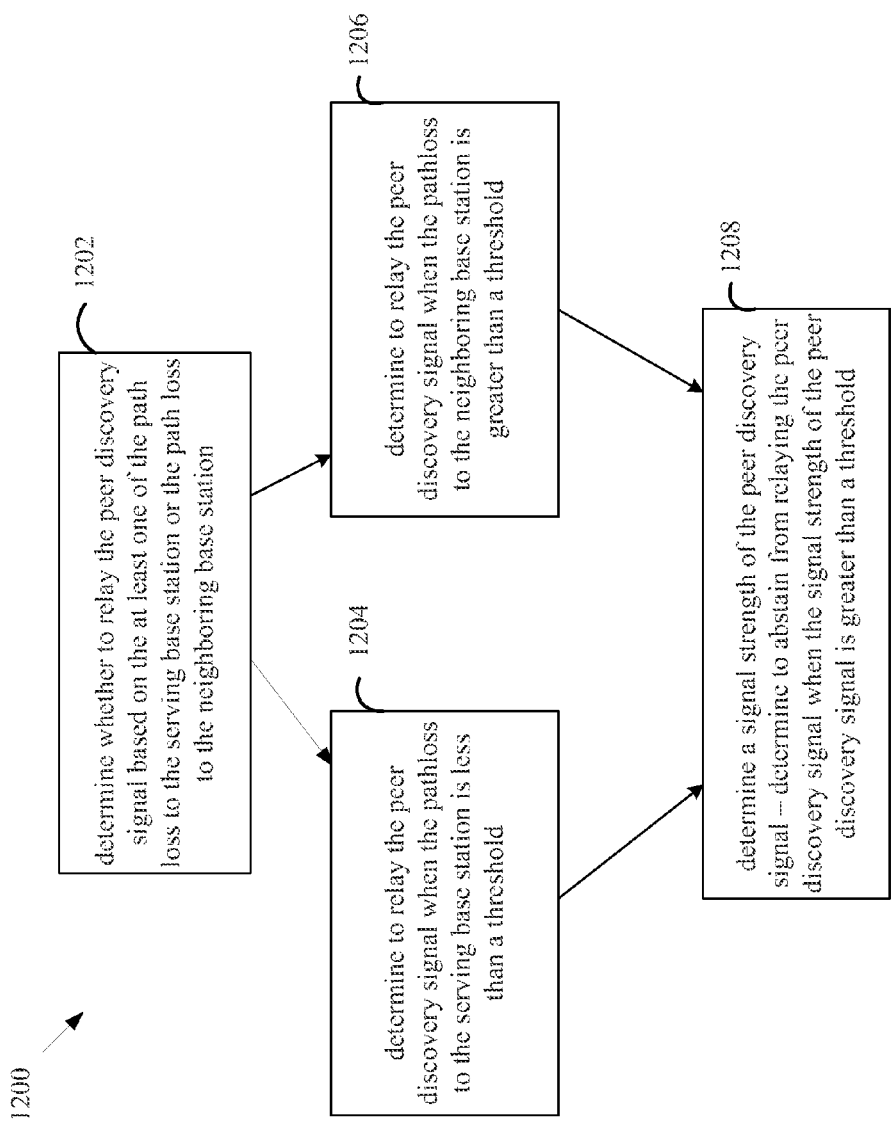
FIG. 15 is a second flow chart of a method of wireless communication.

FIG. 15 is a second flow chart 1200 of a method of wireless communication. As shown in FIG. 15, the wireless device 402 may determine whether to relay the peer discovery signal 420 (1202) by determining to relay the peer discovery signal 420 when the path loss 508 to the serving base station 410 is less than a threshold (1204) and/or the path loss 506 to the neighboring base station 412 is greater than a threshold (1206). Additionally, the wireless device 402 may determine a signal strength of the peer discovery signal (1208). In such a configuration, the wireless device 402 determines whether to relay the peer discovery signal 420 by determining to abstain from relaying the peer discovery signal when the signal strength of the peer discovery signal is greater than a threshold (1208).

Figure 16:
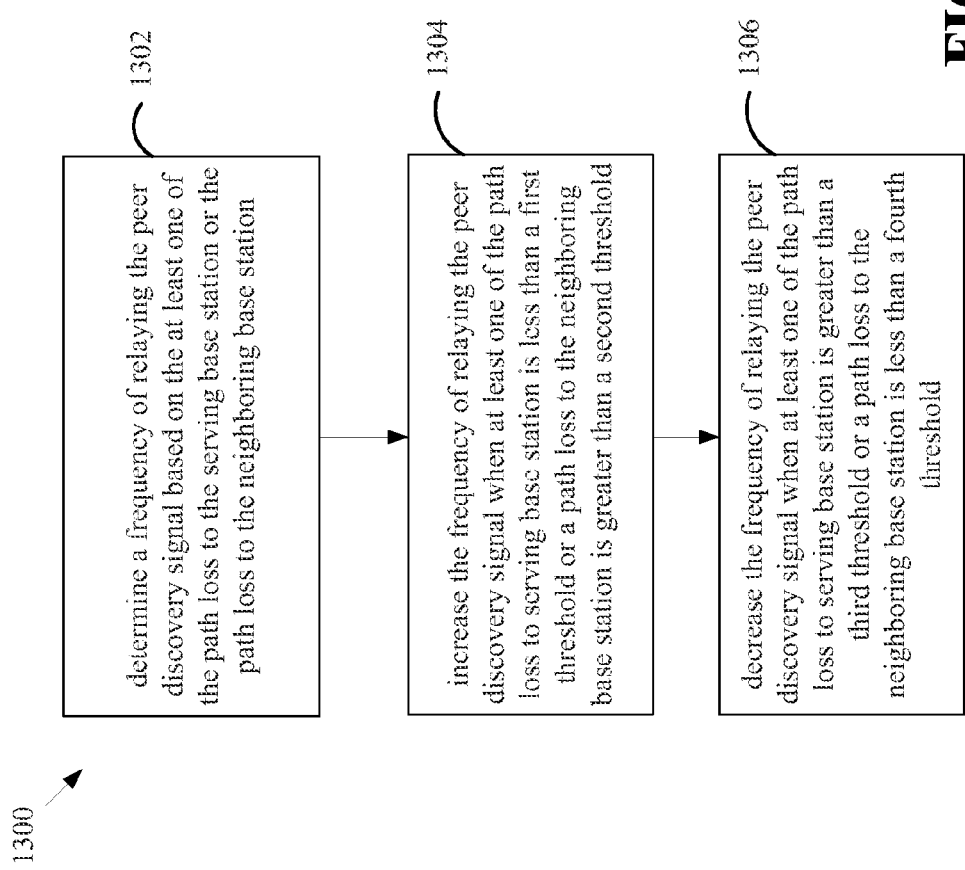
FIG. 16 is a third flow chart of a method of wireless communication.

FIG. 16 is a third flow chart 1300 of a method of wireless communication. In addition to determining to relay a peer discovery signal, the wireless device 402 may determine a frequency of relaying the peer discovery signal 420 based on the at least one of the path loss 508 to the serving base station 410 or the path loss 506 to the neighboring base station 412 (1302). In such a configuration, the wireless device 402 increases the frequency of relaying the peer discovery signal 420 when at least one of the path loss 508 to the serving base station 410 is less than a first threshold or a path loss 506 to the neighboring base station 412 is greater than a second threshold (1304). Furthermore, the wireless device decreases the frequency of relaying the peer discovery signal 420 when at least one of the path loss 508 to the serving base station 410 is greater than a third threshold or a path loss 506 to the neighboring base station 412 is less than a fourth threshold (1306). The first threshold is less than or equal to the third threshold and the second threshold is greater than or equal than the fourth threshold.

Figure 17:
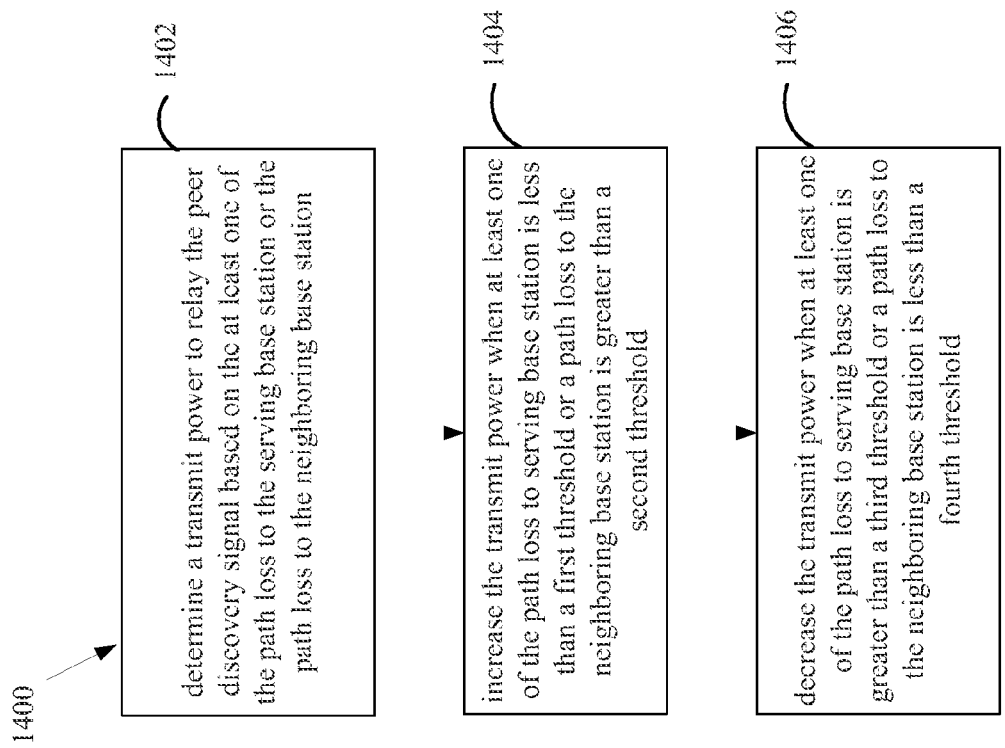
FIG. 17 is a fourth flow chart of a method of wireless communication.

FIG. 17 is a fourth flow chart 1400 of a method of wireless communication. In addition to determining to relay a peer discovery signal, the wireless device 402 may determine a transmit power for relaying the peer discovery signal 420 based on the at least one of the path loss 508 to the serving base station 410 or the path loss 506 to the neighboring base station 412 (1402). In such a configuration, the wireless device 402 increases the transmit power for relaying the peer discovery signal 420 when at least one of the path loss 508 to the serving base station 410 is less than a first threshold or a path loss 506 to the neighboring base station 412 is greater than a second threshold (1404). Furthermore, the wireless device decreases the transmit power for relaying the peer discovery signal 420 when at least one of the path loss 508 to the serving base station 410 is greater than a third threshold or a path loss 506 to the neighboring base station 412 is less than a fourth threshold (1406). The first threshold is less than or equal to the third threshold and the second threshold is greater than or equal than the fourth threshold.

Figure 18:
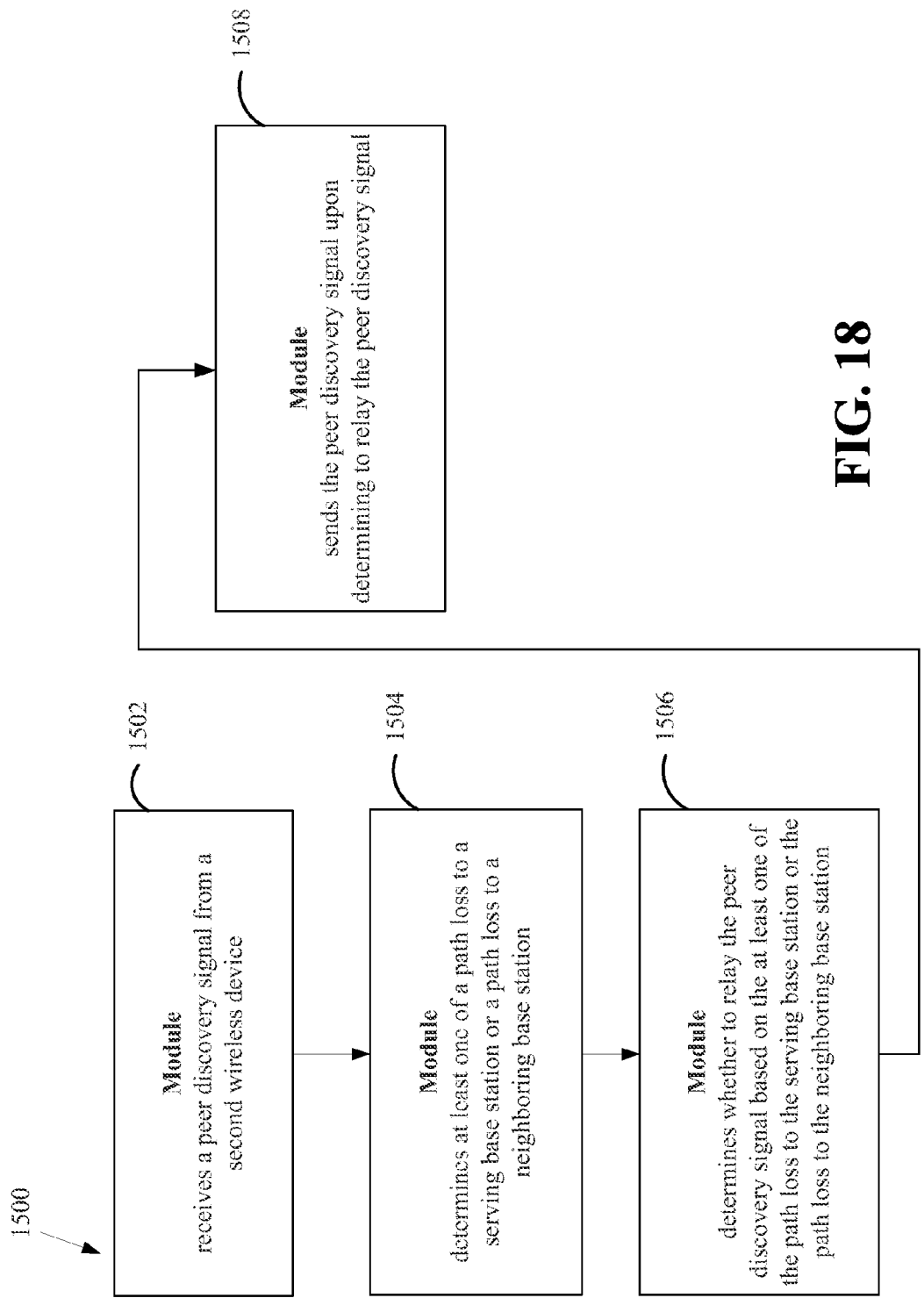
FIG. 18 is a conceptual block diagram illustrating the functionality of an exemplary apparatus.

FIG. 18 is a conceptual block diagram 1500 illustrating the functionality of an exemplary apparatus 100. The apparatus 100 may be a wireless device, such as the wireless device 402. As shown in FIG. 18, the apparatus 100 may include a module 1502 that receives a peer discovery signal from a second wireless device. The apparatus 100 further includes a module 1504 that determines at least one of a path loss to a serving base station or a path loss to a neighboring base station. The apparatus 100 further includes a module 1506 that determines whether to relay the peer discovery signal based on the at least one of the path loss to the serving base station or the path loss to the neighboring base station. The apparatus 100 further includes a module 1508 that sends the peer discovery signal upon determining to relay the peer discovery signal. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication includes means for receiving a peer discovery signal from a second wireless device, means for determining at least one of a path loss to a serving base station or a path loss to a neighboring base station, means for determining whether to relay the peer discovery signal based on the at least one of the path loss to the serving base station or the path loss to the neighboring base station, and means for sending the peer discovery signal upon determining to relay the peer discovery signal. The apparatus 100 may further include means for determining a signal strength of the received peer discovery signal. In such a configuration, the apparatus 100 determines whether to relay the peer discovery signal by determining to abstain from relaying the peer discovery signal when the signal strength of the peer discovery signal is greater than a threshold. The apparatus 100 may further include means for determining a frequency of relaying the peer discovery signal based on the at least one of the path loss to the serving base station or the path loss to the neighboring base station. The apparatus 100 may further include means for increasing the frequency of relaying the peer discovery signal when at least one of the path loss to the serving base station is less than a first threshold or a path loss to the neighboring base station is greater than a second threshold, and means for decreasing the frequency of relaying the peer discovery signal when at least one of the path loss to the serving base station is greater than a third threshold or a path loss to the neighboring base station is less than a fourth threshold. The apparatus 100 may further include means for determining a transmit power for relaying the peer discovery signal based on the at least one of the path loss to the serving base station or the path loss to the neighboring base station. The apparatus 100 may further include means for increasing the transmit power when at least one of the path loss to the serving base station is less than a first threshold or a path loss to the neighboring base station is greater than a second threshold, and means for decreasing the transmit power when at least one of the path loss to the serving base station is greater than a third threshold or a path loss to the neighboring base station is less than a fourth threshold. The aforementioned means may be the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a first wireless device, comprising:
   receiving a peer discovery signal from a second wireless device;
   determining at least one of a path loss to a serving base station or a path loss to a neighboring base station;
   determining whether to relay the peer discovery signal based on the at least one of the path loss to the serving base station or the path loss to the neighboring base station; and
   sending the peer discovery signal upon determining to relay the peer discovery signal,
   wherein the determining whether to relay the peer discovery signal comprises determining to relay the peer discovery signal when the path loss to the neighboring base station is greater than a threshold.

2. The method of claim 1, wherein the determining whether to relay the peer discovery signal further comprises determining to relay the peer discovery signal when the path loss to the serving base station is less than a threshold.

3. The method of claim 1, further comprising determining a frequency of relaying the peer discovery signal based on the at least one of the path loss to the serving base station or the path loss to the neighboring base station.

4. The method of claim 1, further comprising determining a transmit power for relaying the peer discovery signal based on the at least one of the path loss to the serving base station or the path loss to the neighboring base station.

5. A method of operating a first wireless device, comprising:
   receiving a peer discovery signal from a second wireless device;
   determining at least one of a path loss to a serving base station or a path loss to a neighboring base station;
   determining whether to relay the peer discovery signal based on the at least one of the path loss to the serving base station or the path loss to the neighboring base station;
   determining a signal strength of the received peer discovery signal, wherein the determining whether to relay the peer discovery signal comprises determining to abstain from relaying the peer discovery signal when the signal strength of the peer discovery signal is greater than a threshold; and
   sending the peer discovery signal upon determining to relay the peer discovery signal.

6. A method of operating a first wireless device, comprising:
   receiving a peer discovery signal from a second wireless device;
   determining at least one of a path loss to a serving base station or a path loss to a neighboring base station;
   determining whether to relay the peer discovery signal based on the at least one of the path loss to the serving base station or the path loss to the neighboring base station;

determining a frequency of relaying the peer discovery signal based on the at least one of the path loss to the serving base station or the path loss to the neighboring base station;
increasing the frequency of relaying the peer discovery signal when at least one of the path loss to the serving base station is less than a first threshold or a path loss to the neighboring base station is greater than a second threshold;
decreasing the frequency of relaying the peer discovery signal when at least one of the path loss to the serving base station is greater than a third threshold or a path loss to the neighboring base station is less than a fourth threshold; and
sending the peer discovery signal upon determining to relay the peer discovery signal.

7. A method of operating a first wireless device, comprising:
receiving a peer discovery signal from a second wireless device;
determining at least one of a path loss to a serving base station or a path loss to a neighboring base station;
determining whether to relay the peer discovery signal based on the at least one of the path loss to the serving base station or the path loss to the neighboring base station;
determining a transmit power for relaying the peer discovery signal based on the at least one of the path loss to the serving base station or the path loss to the neighboring base station;
increasing the transmit power when at least one of the path loss to the serving base station is less than a first threshold or a path loss to the neighboring base station is greater than a second threshold;
decreasing the transmit power when at least one of the path loss to the serving base station is greater than a third threshold or a path loss to the neighboring base station is less than a fourth threshold; and
sending the peer discovery signal upon determining to relay the peer discovery signal.

8. A method of operating a first wireless device, comprising:
receiving a peer discovery signal from a second wireless device;
determining at least one of a path loss to a serving base station or a path loss to a neighboring base station;
determining whether to relay the peer discovery signal based on the at least one of the path loss to the serving base station or the path loss to the neighboring base station; and
sending the peer discovery signal upon determining to relay the peer discovery signal,
wherein the peer discovery signal is received on a first resource in a set of resources associated with a particular identifier and the peer discovery signal is relayed on a second resource unassociated with the particular identifier.

9. A method of operating a first wireless device, comprising:
receiving a peer discovery signal from a second wireless device;
determining at least one of a path loss to a serving base station or a path loss to a neighboring base station;
determining whether to relay the peer discovery signal based on the at least one of the path loss to the serving base station or the path loss to the neighboring base station; and
sending the peer discovery signal upon determining to relay the peer discovery signal, wherein the peer discovery signal is received on a first resource in a set of resources associated with a particular identifier, and the peer discovery signal is relayed on a second resource in the set of resources.

10. The method of claim 9, wherein the second resource is the same resource on which the peer discovery signal is sent by the second wireless device.

11. The method of claim 10, wherein the peer discovery signal is relayed on a relaying subset of the set of resources, the second resource being in the relaying subset of the set of resources.

12. The method of claim 11, wherein the set of resources comprises the relaying subset of resources and a listening subset of resources different from the relaying subset of resources, the first resource being in the listening subset of resources, the method further comprising listening for peer discovery signals transmitted on the listening subset of resources.

13. A computer program product in a first wireless device, comprising:
a non-transitory computer-readable medium comprising code for:
receiving a peer discovery signal from a second wireless device;
determining at least one of a path loss to a serving base station or a path loss to a neighboring base station;
determining whether to relay the peer discovery signal based on the at least one of the path loss to the serving base station or the path loss to the neighboring base station; and
sending the peer discovery signal upon determining to relay the peer discovery signal,
wherein the code for determining whether to relay the peer discovery signal determines to relay the peer discovery signal when the path loss to the neighboring base station is greater than a threshold.

14. The computer program product of claim 13, wherein the code for determining whether to relay the peer discovery signal further determines to relay the peer discovery signal when the path loss to the serving base station is less than a threshold.

15. The computer program product of claim 13, wherein the non-transitory computer-readable medium further comprises code for determining a frequency of relaying the peer discovery signal based on the at least one of the path loss to the serving base station or the path loss to the neighboring base station.

16. The computer program product of claim 13, wherein the non-transitory computer readable medium further comprises code for determining a transmit power for relaying the peer discovery signal based on the at least one of the path loss to the serving base station or the path loss to the neighboring base station.

17. A computer program product in a first wireless device, comprising:
a non-transitory computer-readable medium comprising code for:
receiving a peer discovery signal from a second wireless device;
determining at least one of a path loss to a serving base station or a path loss to a neighboring base station;
determining whether to relay the peer discovery signal based on the at least one of the path loss to the serving base station or the path loss to the neighboring base station;

determining a signal strength of the received peer discovery signal, wherein the code for determining whether to relay the peer discovery signal determines to abstain from relaying the peer discovery signal when the signal strength of the peer discovery signal is greater than a threshold; and sending the peer discovery signal upon determining to relay the peer discovery signal.

18. A computer program product in a first wireless device, comprising:

a non-transitory computer-readable medium comprising code for:

receiving a peer discovery signal from a second wireless device;

determining at least one of a path loss to a serving base station or a path loss to a neighboring base station;

determining whether to relay the peer discovery signal based on the at least one of the path loss to the serving base station or the path loss to the neighboring base station;

determining a frequency of relaying the peer discovery signal based on the at least one of the path loss to the serving base station or the path loss to the neighboring base station;

increasing the frequency of relaying the peer discovery signal when at least one of the path loss to the serving base station is less than a first threshold or a path loss to the neighboring base station is greater than a second threshold;

decreasing the frequency of relaying the peer discovery signal when at least one of the path loss to the serving base station is greater than a third threshold or a path loss to the neighboring base station is less than a fourth threshold; and sending the peer discovery signal upon determining to relay the peer discovery signal.

19. A computer program product in a first wireless device, comprising:

a non-transitory computer-readable medium comprising code for:

receiving a peer discovery signal from a second wireless device;

determining at least one of a path loss to a serving base station or a path loss to a neighboring base station;

determining whether to relay the peer discovery signal based on the at least one of the path loss to the serving base station or the path loss to the neighboring base station;

determining a transmit power for relaying the peer discovery signal based on the at least one of the path loss to the serving base station or the path loss to the neighboring base station;

increasing the transmit power when at least one of the path loss to the serving base station is less than a first threshold or a path loss to the neighboring base station is greater than a second threshold;

decreasing the transmit power when at least one of the path loss to the serving base station is greater than a third threshold or a path loss to the neighboring base station is less than a fourth threshold; and sending the peer discovery signal upon determining to relay the peer discovery signal.

20. A computer program product in a first wireless device, comprising:

a non-transitory computer-readable medium comprising code for:

receiving a peer discovery signal from a second wireless device;

determining at least one of a path loss to a serving base station or a path loss to a neighboring base station;

determining whether to relay the peer discovery signal based on the at least one of the path loss to the serving base station or the path loss to the neighboring base station; and sending the peer discovery signal upon determining to relay the peer discovery signal, wherein the peer discovery signal is received on a first resource in a set of resources associated with a particular identifier and the peer discovery signal is relayed on a second resource unassociated with the particular identifier.

21. A computer program product in a first wireless device, comprising:

a non-transitory computer-readable medium comprising code for:

receiving a peer discovery signal from a second wireless device;

determining at least one of a path loss to a serving base station or a path loss to a neighboring base station;

determining whether to relay the peer discovery signal based on the at least one of the path loss to the serving base station or the path loss to the neighboring base station; and sending the peer discovery signal upon determining to relay the peer discovery signal, wherein the peer discovery signal is received on a first resource in a set of resources associated with a particular identifier, and the peer discovery signal is relayed on a second resource in the set of resources.

22. The computer program product of claim 21, wherein the second resource is the same resource on which the peer discovery signal is sent by the second wireless device.

23. The computer program product of claim 22, wherein the peer discovery signal is relayed on a relaying subset of the set of resources, the second resource being in the relaying subset of the set of resources.

24. The computer program product of claim 23, wherein the set of resources comprises the relaying subset of resources and a listening subset of resources different from the relaying subset of resources, the first resource is in the listening subset of resources, and the non-transitory computer-readable medium further comprises code for listening for peer discovery signals transmitted on the listening subset of resources.

* * * * *